United States Patent [19]

Pizzarello et al.

[11] Patent Number: 5,045,784
[45] Date of Patent: Sep. 3, 1991

[54] TACHOMETER NOISE REDUCTION SYSTEM USING A PICKUP COIL TO CANCEL THE NOISE FROM THE TACHOMETER SIGNAL

[75] Inventors: Frank A. Pizzarello, Yorba Linda; Clifford D. Dax, Mission Viejo, both of Calif.

[73] Assignee: Rockwell International Corporation, El Segundo, Calif.

[21] Appl. No.: 396,581

[22] Filed: Aug. 21, 1989

[51] Int. Cl.⁵ .......................... G01P 3/46; G01P 3/52
[52] U.S. Cl. ................................ 324/163; 310/68 R; 310/155; 310/168; 318/638
[58] Field of Search ............ 324/163; 310/68 R, 155, 310/168; 318/638, 647, 652, 653

[56] References Cited

U.S. PATENT DOCUMENTS

| | | |
|---|---|---|
| 2,458,131 | 1/1949 | Audier et al. . |
| 2,555,992 | 6/1951 | Ogle . |
| 3,252,069 | 5/1966 | Ringrose . |
| 3,936,711 | 2/1976 | Gay . |
| 4,025,934 | 5/1977 | Hartmann et al. . |
| 4,032,094 | 6/1977 | Morgan et al. . |
| 4,104,922 | 8/1978 | Alers et al. . |
| 4,439,715 | 3/1984 | Taylor . |
| 4,441,077 | 4/1984 | Dodgen et al. . |
| 4,755,731 | 7/1988 | Anthony et al. . |
| 4,761,609 | 8/1988 | Dorman et al. . |

Primary Examiner—Walter E. Snow
Attorney, Agent, or Firm—H. Fredrick Hamann; George A. Montanye; Tom Streeter

[57] ABSTRACT

A current carrying drive coil in a magnetic field is moved by the field. An attached tachometer coil, passing through the same field, produces a voltage from which the speed of the coils may be calculated. Changes in the drive coil current produce noise in the tachometer coil. This noise is offset by combining the tachometer voltage with the voltage produced by a stationary pickup coil, which picks up only the noise.

12 Claims, 10 Drawing Sheets

TACHOMETER NOISE REDUCTION SYSTEM USING A PICKUP COIL TO CANCEL THE NOISE FROM THE TACHOMETER SIGNAL

TECHNICAL FIELD

This invention relates to electric motors, both linear and rotary, and to tachometers for electrically measuring the speed of such motors; and it has particular relation to tachometers which screen out electrical noise produced by the motor, and which therefore better detect the speed of the motor.

BACKGROUND ART

An electric tachometer is a coil of wire which passes through a uniform magnetic field and therefore produces a voltage, the voltage being an indication of the motor's speed. The coil may be attached to a moving part of the motor passing through a stationary field, or the coil may be stationary and interact with a moving magnetic field, the relative motion being measured in either case. If the motor is powered by a non-electrical source, such as steam, it is only the relative motion of the coil and the field which produces the voltage. If the motor is powered by electricity, however, changes in the current powering the motor will cause a changing magnetic field, which also will produce a voltage in the coil. This noise appears to be an indication of the speed of the motor, but is not, and must be eliminated or reduced to negligible levels.

SUMMARY OF INVENTION

It is an object of the present invention to provide such an elimination or reduction of electrical noise.

In accordance with the present invention, an external magnet produces temporally fixed lines of magnetic flux, and a drive magnet, which is movable with respect to the external magnet, produces temporally varying lines of magnetic flux. A tachometer coil, which is stationary with respect to the drive magnet, is situated and constructed to produce a motion voltage component from its motion through the lines of flux produced by the external magnet, and is also situated and constructed to produce a drive noise voltage component from the temporal variations in the lines of flux produced by the drive magnet. The motion voltage component and drive noise voltage component combine to form a tachometer voltage. A pickup coil is situated and constructed to produce a pickup voltage from the temporal variations in the lines of magnetic flux produced from the drive magnet. Means are provided for combining the tachometer voltage and the pickup voltage into an output voltage. The output voltage differs from the motion voltage in an amount less than the difference between the tachometer voltage and the motion voltage.

Conveniently, the magnets, coils, and voltage combining means may be situated and constructed such that the motion voltage is proportional to the relative speed of the external magnet and the tachometer coil.

It is likewise convenient for the pickup coil to be stationary with respect to the external magnet.

It is likewise convenient for the means for combining the tachometer voltage and the pickup voltage to comprise means for subtracting the pickup voltage from the tachometer voltage.

The present invention may also be viewed as a method for measuring the speed of an electric motor, in which an external magnet produces temporally fixed lines of magnetic flux, and in which a drive magnet (which is movable with respect to the external magnet) produces temporally varying lines of magnetic flux. When so viewed, a method comprises measuring a tachometer voltage with a tachometer coil (the tachometer coil being substantially as described above), measuring a pickup voltage with a pickup coil (the pickup coil being substantially as described above), and combining a tachometer voltage from the tachometer coil and the pickup voltage from the pickup coil into an output voltage, substantially as described above.

The present invention may also be viewed as means for carrying out the foregoing method.

The convenient constructions of the present invention when viewed as an apparatus apply with equal force to the invention when viewed as a method, or as a means for carrying out the method.

PREFERRED EMBODIMENT FOR CARRYING OUT THE INVENTION

Figure 1:
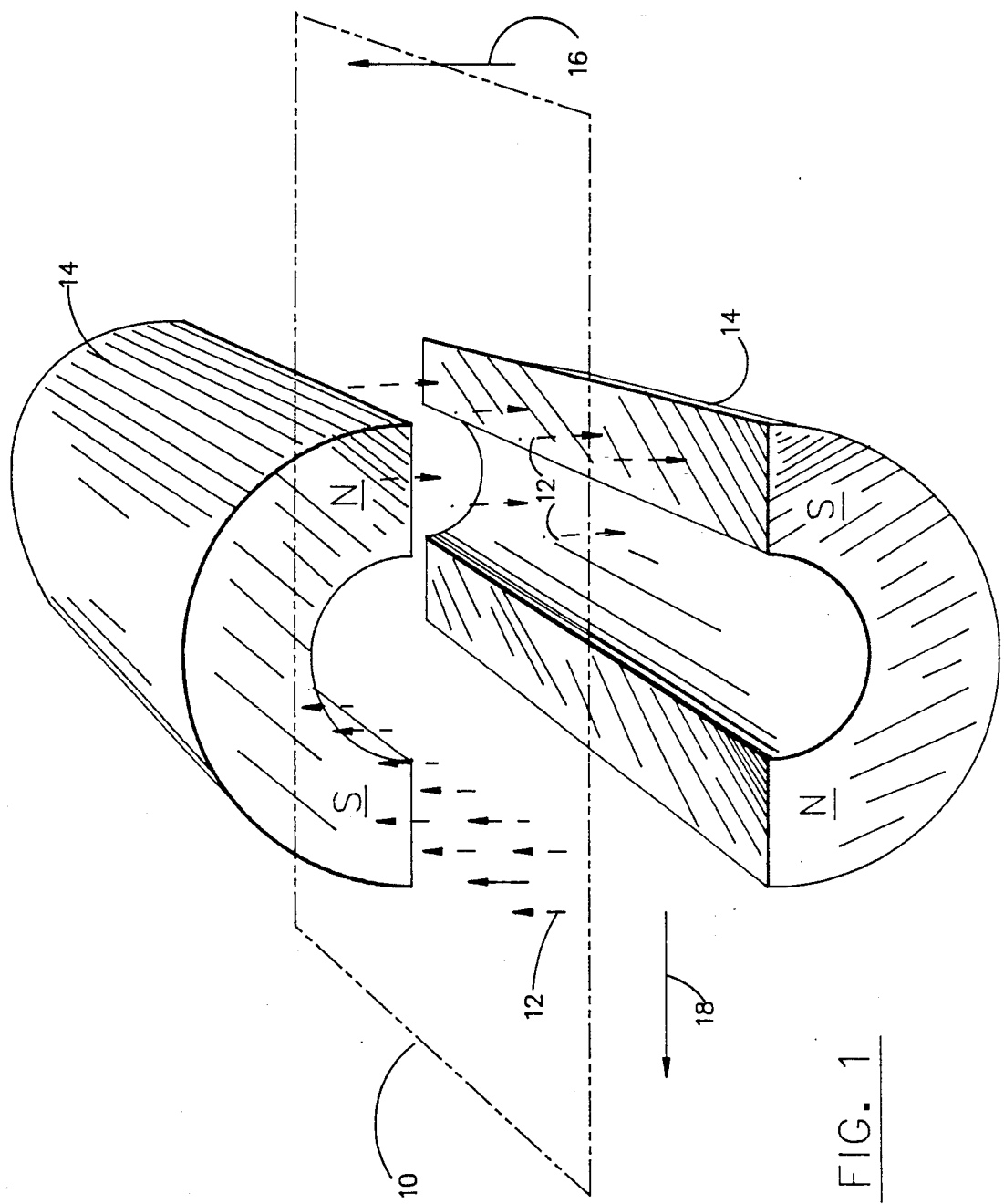
FIG. 1 shows a uniform rectilinear magnetic flux, half pointing up, and half pointing down.
Figure 2:
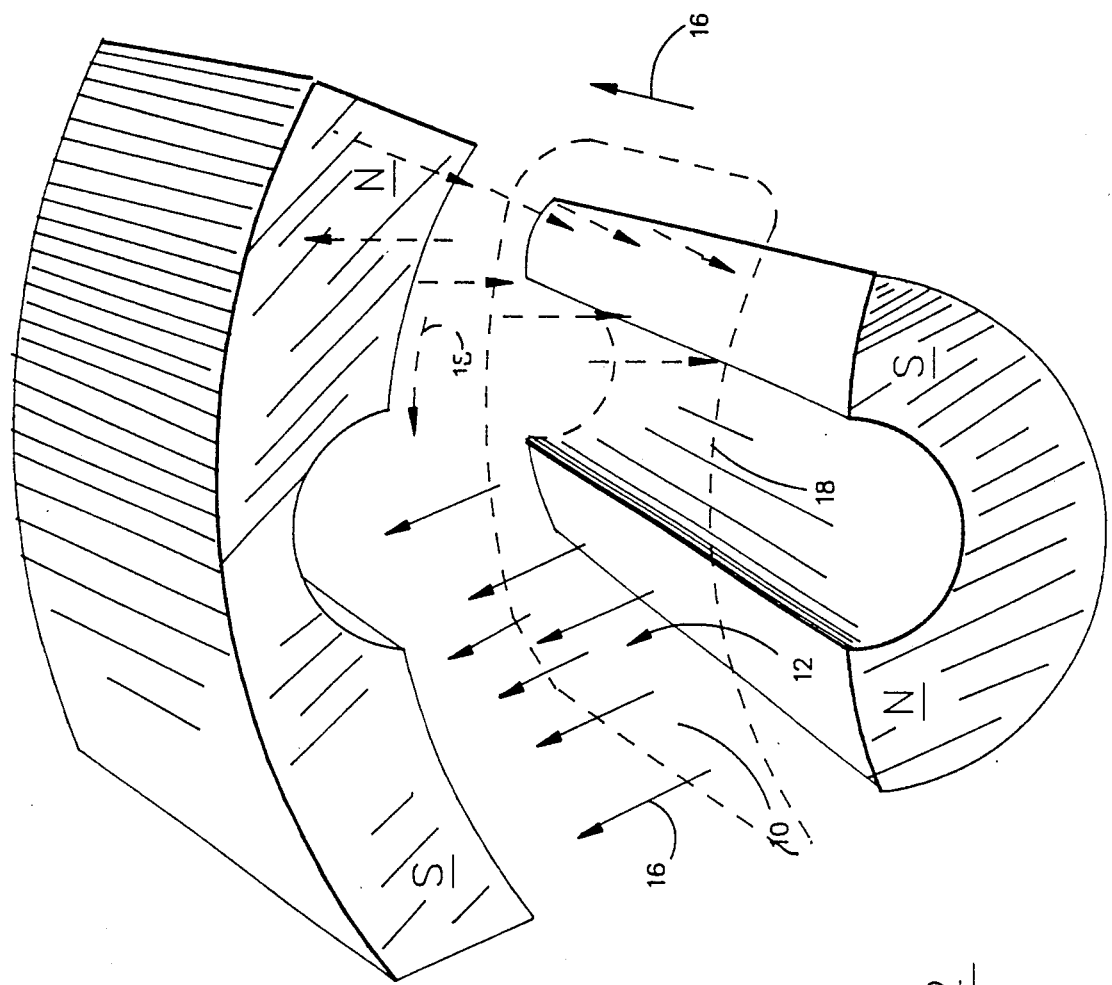
FIG. 2 shows a uniform radial magnetic field, half pointing in, and half pointing out.

Turning now to FIG. 1, a first surface 10 has a field of external lines 12 of magnetic flux produced by an external magnet 14 pointing through the surface 10 in a first direction 16, perpendicular to the surface 10. The surface 10 may be flat (FIG. 1) when measuring the speed of linear motors, or may be curved to conform to the side of a cylinder (FIG. 2) when measuring the speed of rotary motors. The strength of the flux 12 varies with respect to a second direction 18 which is parallel to the surface 10 and perpendicular to the first direction 16. In a curved surface (FIG. 2), the first direction 16 is radial and the second direction 18 is azimuthal. Whether the surface 10 is flat or curved, the flux 12 is uniform and points in one direction in one region of the surface 10, and is of equal and opposite strength in another region of the surface 10.

Figure 3:
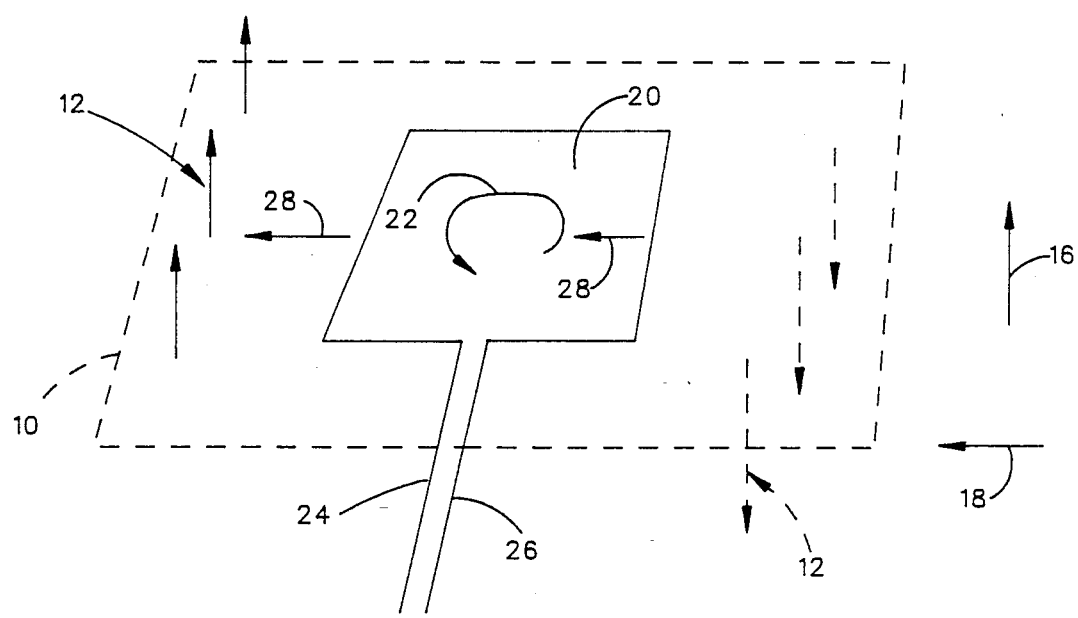
FIG. 3 shows a current carrying coil being deflected by a magnetic field.

Turning now to FIG. 3, a drive coil 20 is restrained to move only in the surface 10, and a current 22 is directed through it through leads 24, 26. The magnetic field 12 therefore exerts a force 28 on the coil 20 in the second direction 18. If the direction of the current 22 is reversed, the force 28 is exerted opposite to the second direction 18.

Figure 4:
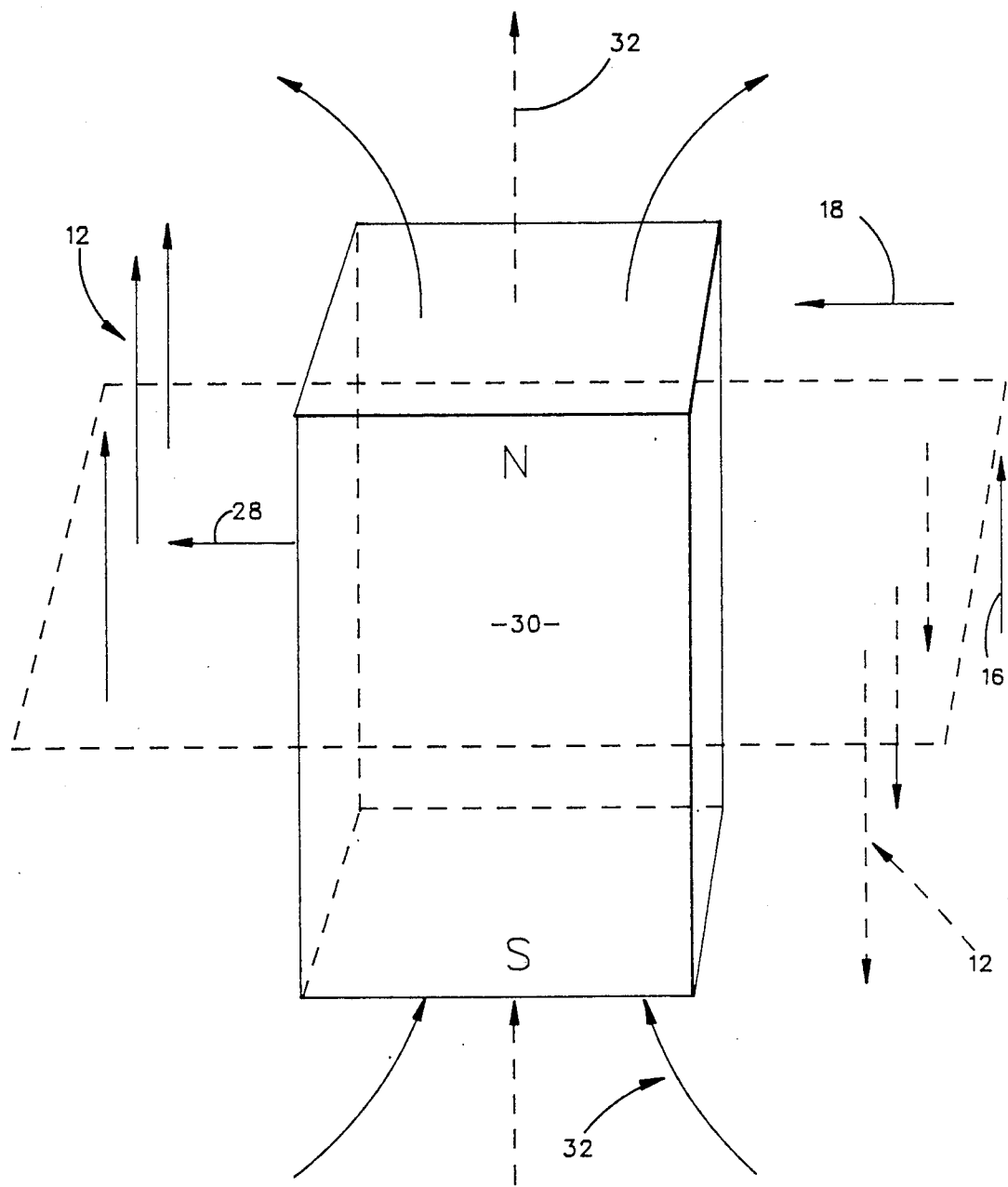
FIG. 4 is the equivalent of FIG. 3, from the viewpoint of magnetics rather than electromagnetics.

Viewed equivalently from the viewpoint of magnetics rather than electromagnetics (FIG. 4), the drive coil 20 is a drive magnet 30 which produces variable drive lines 32 of magnetic flux. The external lines 12 and drive lines 32 of magnetic flux interact with each other, such that the external lines 12 exert a force 28 on the drive lines 32. This force 28 between the lines 12 and 32 appears as the force 28 on the drive magnet 30. Like the drive coil 20, the drive magnet 30 is restrained to move only in the surface 10.

Figure 6:
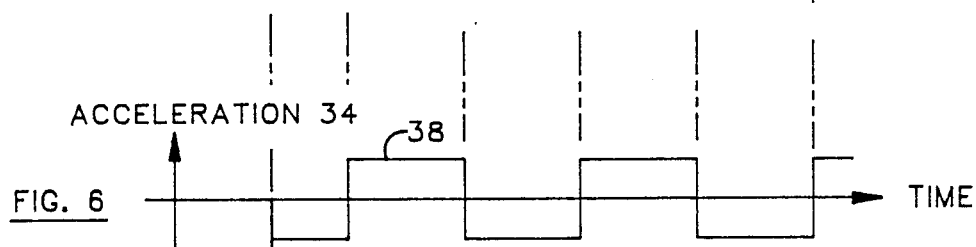
FIG. 6 is a graph of acceleration versus time, and is aligned with FIG. 5.
Figure 7:
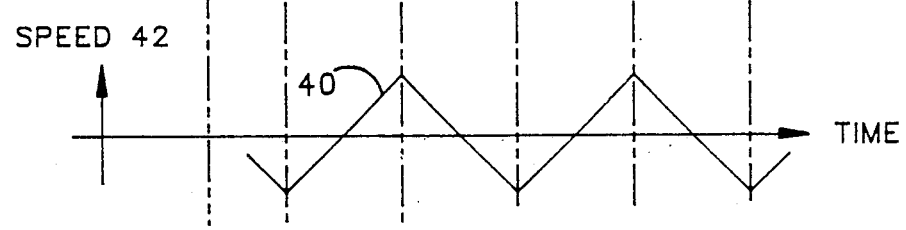
FIG. 7 is a graph of speed versus time, and is aligned with FIGS. 5–6.

The magnitude of the force 28 is proportional to the strength of the current 22. The drive coil 20 is situated and constructed to be free to move in the second direction 18. Accordingly, the acceleration 34 of the drive coil 20 is proportional to the strength of the current 22. A square wave 36 of current 22 may conveniently be applied to the drive coil 20 (FIG. 5), and will therefore produce a square wave 38 of acceleration 34 (FIG. 6), or, equivalently, a triangular wave 40 of speed 42 (FIG. 7).

Figure 8:
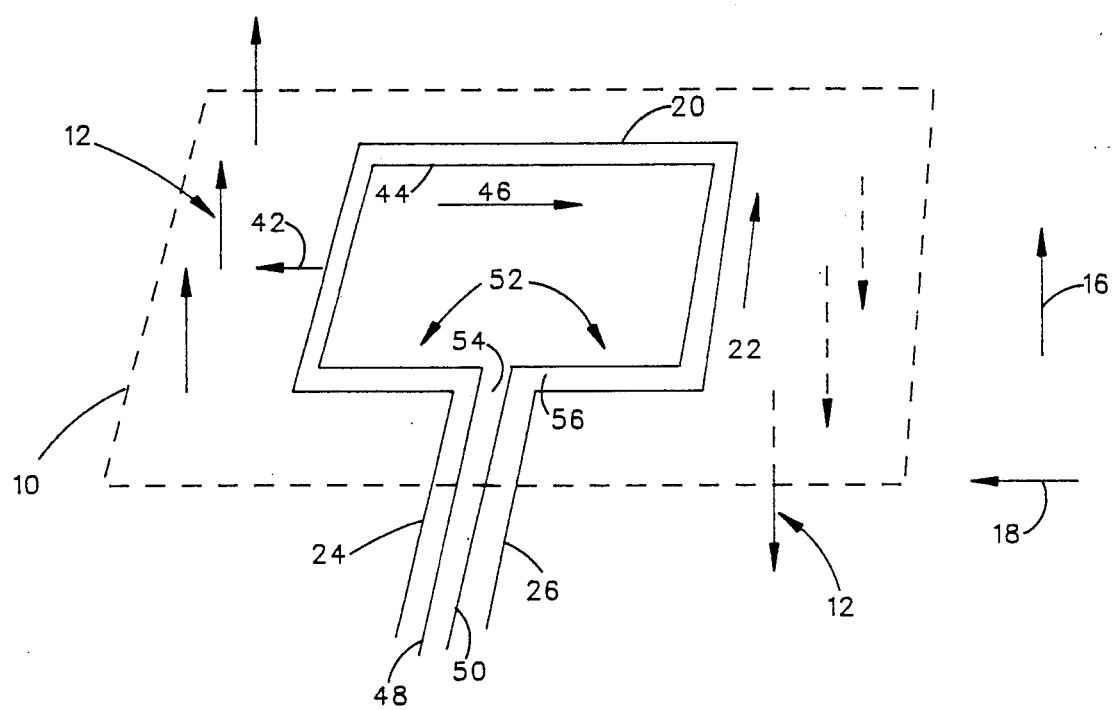
FIG. 8 shows a current-carrying coil being deflected by a magnetic field, taking a second coil with it, the second coil generating a motion voltage.
Figure 9:
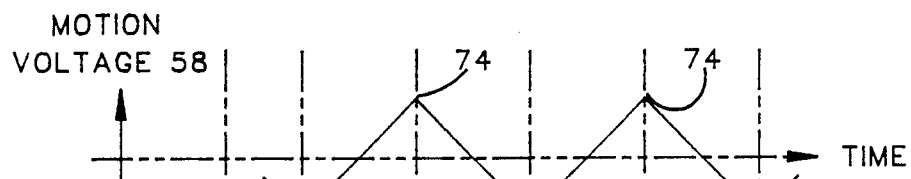
FIG. 9 is a graph of motion voltage versus time, and is aligned with FIGS. 5–7.

As shown in FIG. 8, a tachometer coil 44, similar to the drive coil 20, is rigidly affixed to the drive coil 20. Both coils 20, 44 are moved in the same direction 18 through the same external field 12. The flux 12 accordingly creates a tachometer voltage 46 in the tachometer coil 44, having a polarity such as to cause a current to flow in the direction of arrow "A". The tachometer voltage 46 may be conveniently measured at a pair of leads 48, 50 at the side 52 of the tachometer coil 44; that is, leads 48, 50 enter the tachometer coil 44 at a point 54 where the wire 56 comprising the tachometer coil 44 is pointed in the second direction 18. The strength of the tachometer voltage 46 is proportional to the speed 42 of the coils 20, 44. The coils 20, 44 undergo a square wave 38 of acceleration 34. If the motion of the coils 20, 44 is non-electrical, then the voltage produced by of the tachometer coil 44 is the same as the voltage component 58 (called herein the "motion voltage") produced by the tachometer coil 44 solely through reaction with the external magnetic field 12. The motion voltage 58 (and therefore the tachometer voltage 46) thus displays a triangular wave 60 (FIG. 9).

The tachometer coil 44 may conveniently be situated coplanar and coaxial with the drive coil 20. When the coils 20, 44 are moved in a triangular wave of speed by a non-electrical source, such as steam, the tachometer voltage 46 displays a triangular wave 60. However, when the coils 20, 44 are moved electrically, matters are more complex. When the square wave 36 of current 22 is directed through the drive coil 20, it produces the above noted square wave 38 of acceleration 34 of the coils 20, 44 and the above noted triangular wave 40 of speed 42 of the coils 20, 44. It should, but does not, produce the above noted triangular wave 60 of voltage 46 from the tachometer coil 44.

Figure 5:
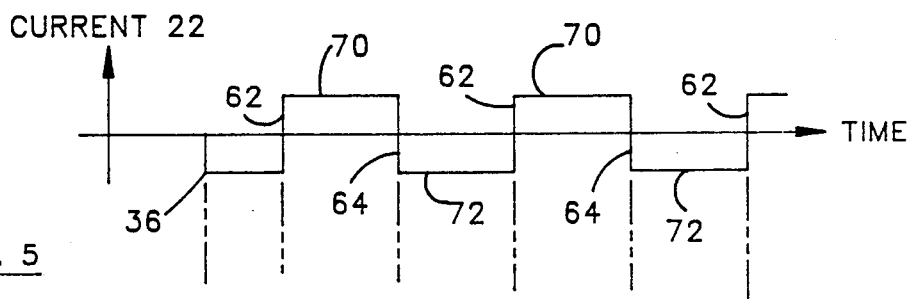
FIG. 5 is a graph of current versus time.
Figure 10:
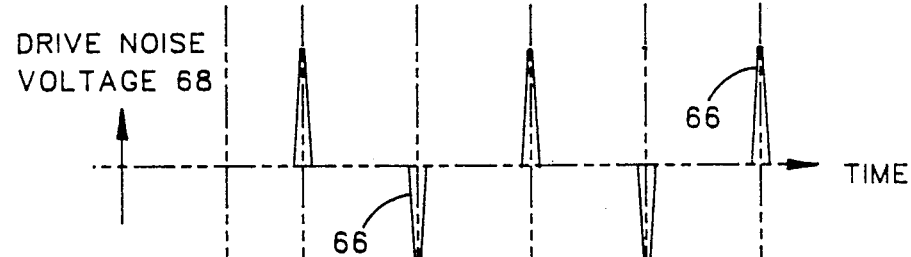
FIG. 10 is a graph of noise voltage versus time, and is aligned with FIGS. 5–7 and 9.

The reason that a pure triangular wave 60 of tachomter voltage 46 is not produced is that the square wave 36 of current 22 through the drive coil 20 produces a variation in the magnetic field 32 at both the leading edge 62 and the trailing edge 64 of the current wave 36 (FIG. 5). This variation in the magnetic field 32 is separate and apart from the external field 12. The variation in the magnetic field 32 passes through the tachometer coil 44 and produces noise: a sharp voltage pulse 66 in the output of the tachometer coil 44 (FIG. 10). This voltage 68, produced solely by the variation in the magnetic field 32 of the drive coil 20, is called herein the "noise voltage."

Figure 11:
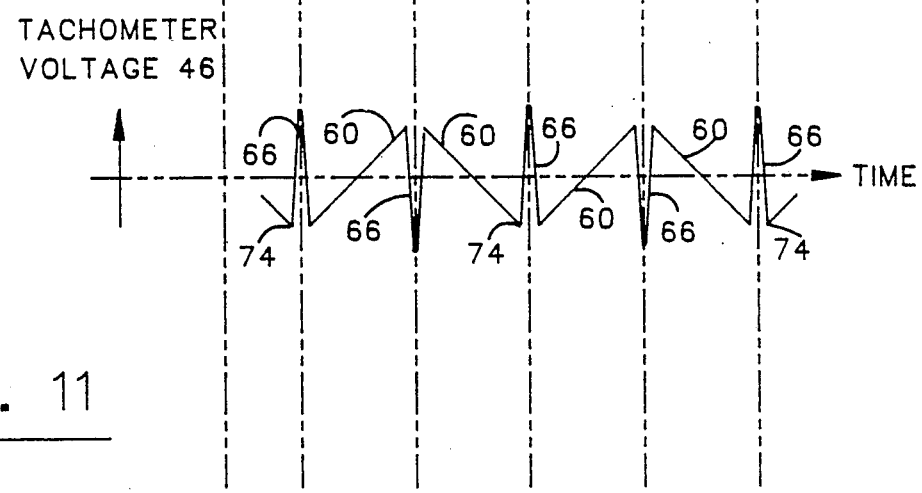
FIG. 11 is a graph of tachometer voltage versus time, and is aligned with FIGS. 5–7 and 9–10.

It is only the variation in the drive coil's magnetic field 32 which produces this pulse 66. When the drive coil's magnetic field 12 is constant, as it is during the top 70 and bottom 72 of the current square wave 36 (FIG. 5), no noise voltage 68 is produced in the tachometer coil 44 by the drive coil's magnetic field 32. Indeed, the only reason why the tachometer coil 44 produces a motion voltage 58 in response to its speed through the external field 12 is that the strength of the external field 12 points in one direction at the leading edge of the tachometer coil 44 and is of equal strength, but points in the opposite direction, at the trailing edge of the tachometer coil 44. The tachometer voltage 46 is therefore a superposition of a triangular wave 60 and a sharp pulse 66 at each vertex 74 of the triangular wave 60 (FIG. 11).

The speed of the coils 20, 44 can be determined from the voltage 46 produced by the tachometer coil 44, or it could be if the pulse 66 could be eliminated. This determination is complicated if the external field 12 is not precisely uniform, but a correction factor can be introduced, since the external magnetic field 12 is fixed and known. However, it is difficult or impossible to correct for the pulse 66, since the drive coil 20 will be receiving more than just a simple square wave 36 of current 22 with a known period and amplitude. It will be desired to move the coils for a particular time at a particular acceleration. The period and amplitude of the current pulse needed to thus produce this result may readily be calculated, but this period and amplitude will not be known at the time when the correction factor must be determined. The pulse 66 must therefore somehow be eliminated or, at least, be made negligibly small in comparison with the motion voltage 58.

Figure 12:
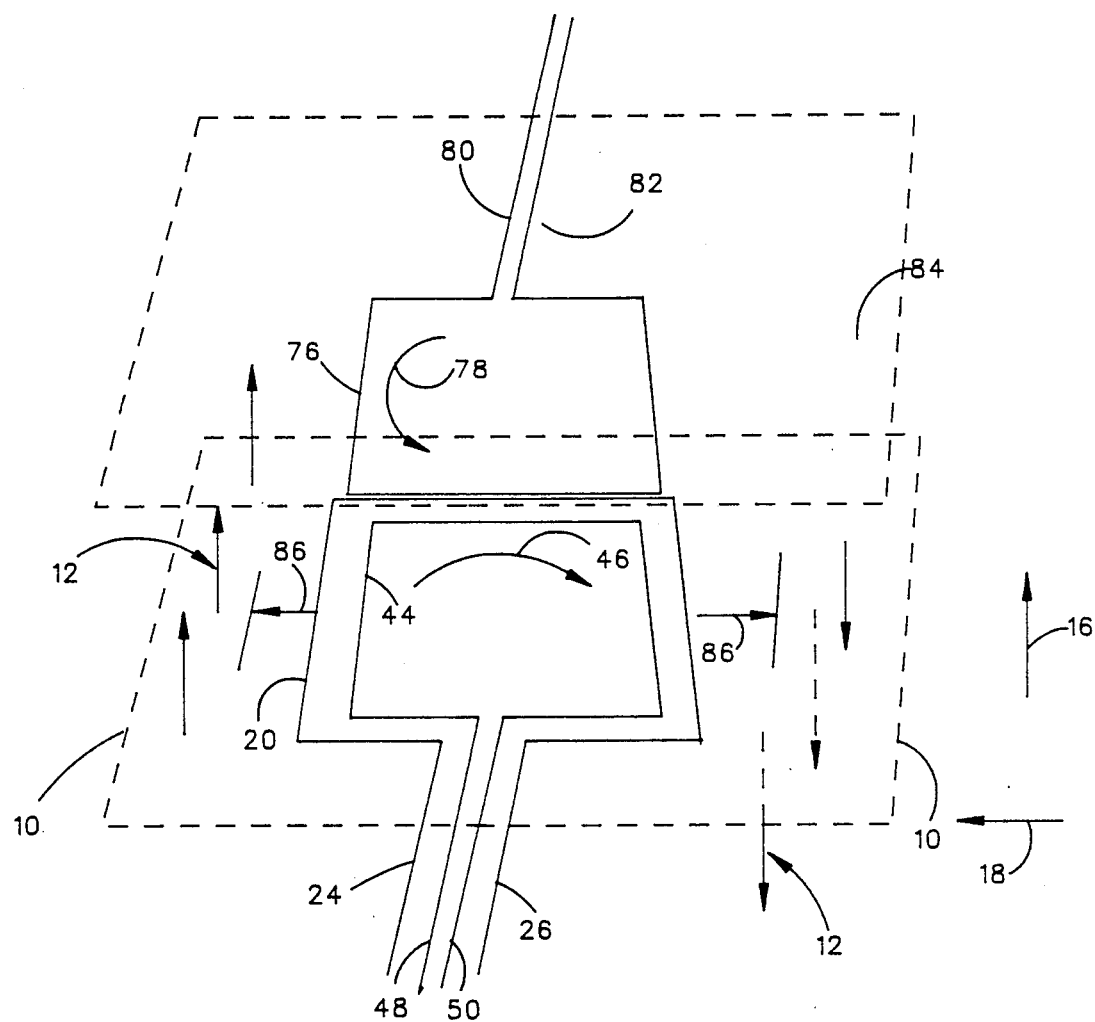
FIG. 12 shows a moving current carrying coil and attached voltage generating coil, together with a stationary pickup coil.

As shown in FIG. 12, Applicants make this pulse 66 negligibly small, or eliminate it entirely, by providing a pickup coil 76 which is kept at rest with respect to the external magnetic field 12. Since the pickup coil 76 is at rest, the external magnetic field 12 produces no voltage in it as the first 20 and second 44 coils are moved. The pickup coil 76 is so situated and constructed that, if a variation in the drive coil's magnetic field 32 passes through the tachometer coil 44, then a proportional variation also passes through the pickup coil 76, and produces therein a pickup voltage 78, having a polarity such as to cause a current to flow in the direction of arrow "B". This voltage 78 may be detected through leads 80 and 82, which are similar to the leads 48 and 50 of the tachometer coil 44.

This is most easily done by situating the pickup coil 76 in a second surface 84 which is parallel to and close to the surface 10 of the tachometer coil 44, by limiting the range of travel 86 of the tachometer coil 44, and by making the pickup coil 76 large enough to encompass the tachometer coil's range of travel 86. However, any situation and construction of the pickup coil 76 is satisfactory if it causes each change in the drive coil's magnetic field 32 passing through the tachometer coil 44 to produce a proportional variation in the field 32 passing through the pickup coil 76.

The proportional change in the magnetic field 32 at coils 44 and 76 may be converted to an equal change in voltages 46 and 78 by appropriately fixing the ratio of the number of turns of the tachometer coil 44 and pickup coil 76.

Figure 13:
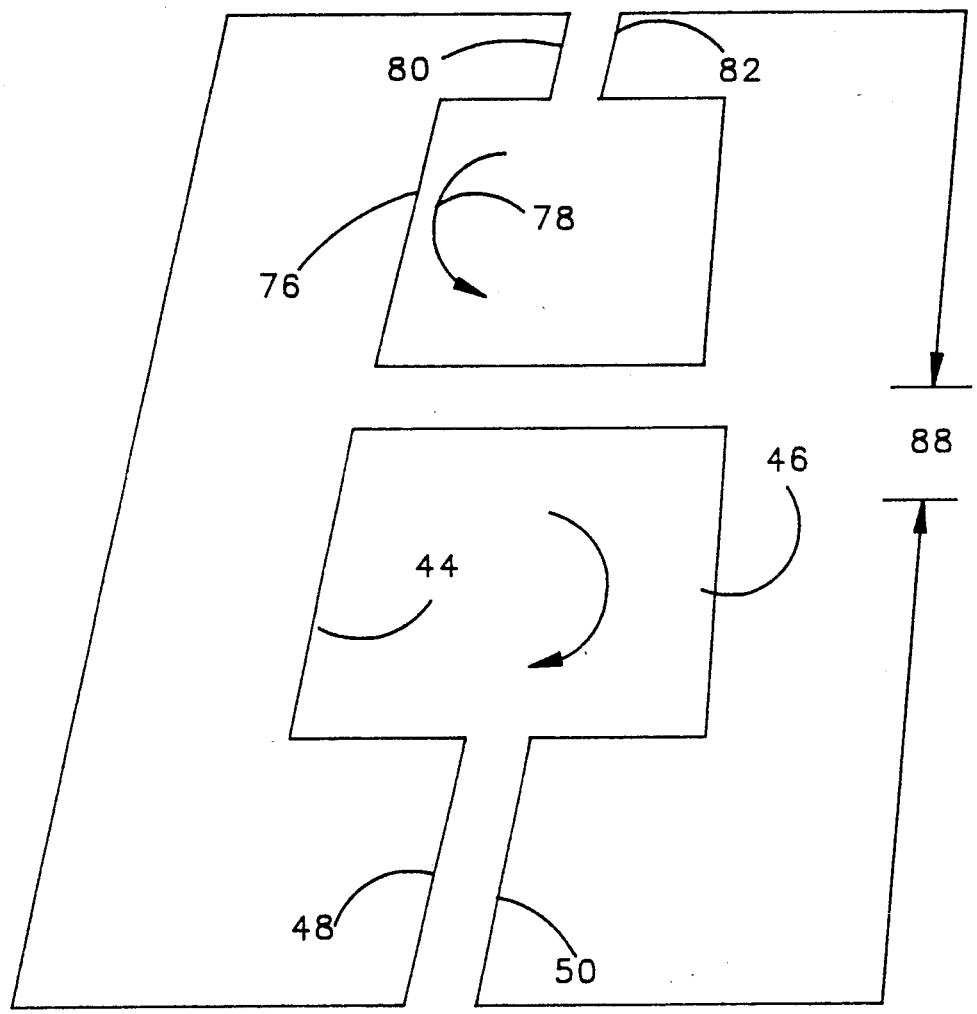
FIG. 13 shows the combination of voltages from the pickup coil and the tachometer coil.

The tachometer voltage 46 and pickup voltage 78 are combined into an output voltage 88. This is most easily accomplished (FIG. 13) by joining a lead 48 from the tachometer coil 44 to a lead 80 from the pickup coil 76, and by measuring the voltage 88 between the other tachometer lead 50 and the other pickup lead 82. The pickup coil 76 may be oriented so that the pickup voltage 78 is subtracted from the tachometer voltage 46.

Figure 14:
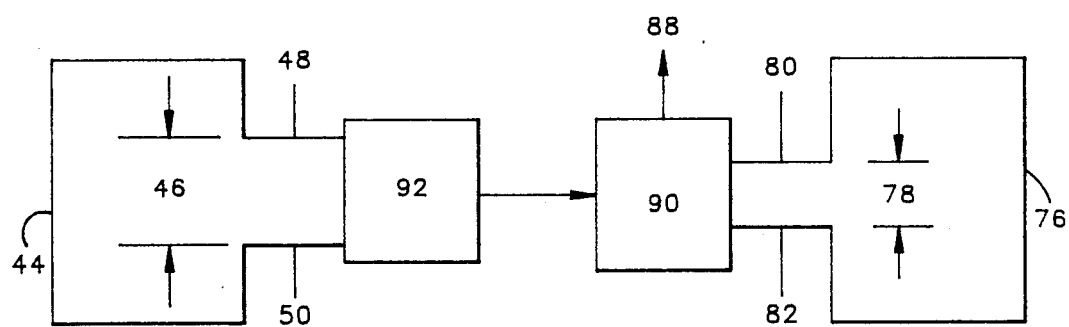
FIG. 14 shows a circuit for combining the tachometer voltage and the pickup voltage.

Alternatively, as shown in FIG. 14, a summing circuit (or, as appropriate, a different circuit) 90 could be used. Likewise, proportionality can be obtained by a multiplying circuit (or, as appropriate, a dividing circuit) 92, instead of (or in addition to) fixing the ratio of the number of turns.

The pickup coil 76 may be so situated and constructed so that the pickup voltage 78 only partially offsets the noise voltage 68. Such a partial offset may be valuable if, as sometimes will be the case, the offset is sufficient to allow the speed of the tachometer coil 44 to be determined within pre-established design limits.

INDUSTRIAL APPLICABILITY

The present invention is capable of exploitation in industry, and may be used, whenever it is desired to know the speed of an electric motor, with little or no detected noise from the motor. It may be made of conventional coils and magnets, or of their non-conventional analogues.

The present invention is of particular use in regulating a light weight mirror for use in optical scanning. It may, however, be used in any situation in which a motor drive coil produces spurious signals which are picked up by an electric tachometer.

While a particular embodiment of the present invention has been described, the true spirit and scope of the present invention is not limited thereto, but is defined by the appended claims.

What is claimed is:

1. An electric tachometer motor system comprising:
an external magnet which produces temporally fixed lines of magnetic flux;
a drive coil, energized by a source of varying current, said drive coil being movable with respect to the external magnet, and producing temporally varying lines of magnetic flux;
a tachometer coil, which is stationary with respect to the drive coil, and which is situated and constructed to produce a motion voltage component from its motion through the lines of flux produced by the external magnet and a drive noise voltage component from the temporal variations in the lines of magnetic flux produced by the drive coil, the motion voltage component and drive noise voltage component combining to form a tachometer voltage;
a pickup coil which is situated adjacent to the drive coil, and at least approximately parallel to, and at least approximately concentric with, the drive coil, and which is constructed to produce a pickup voltage from the temporal variations in the lines of magnetic flux produced from the drive coil; and
means for combining the tachometer voltage and the pickup voltage into an output voltage differing from the motion voltage in an amount less than the difference between the tachometer voltage and the motion voltage.

2. The apparatus of claim 1, wherein the magnets, coils, and voltage combining means are situated and constructed such that the motion voltage is proportional to the relative speed of the external magnet and the tachometer coil.

3. The apparatus of claim 1, wherein the pickup coil is stationary with respect to the external magnet.

4. The apparatus of claim 1, wherein the means for combining the tachometer voltage and the pickup voltage comprises means for subtracting the pickup voltage from the tachometer voltage.

5. In an electric motor comprising:
an external magnet which produces temporally fixed lines of magnetic flux; and
a drive coil, energized by a source of varying current, said drive coil being movable with respect to the external magnet, and producing temporally varying lines of magnetic flux;
a method for measuring the speed of said motor, the method comprising:
measuring a tachometer voltage with a tachometer coil, the tachometer coil being stationary with respect to the drive coil, and being situated and constructed to produce a motion voltage component from its motion through the lines of flux produced by the external magnet and a drive noise voltage component from temporal variations in the lines of magnetic flux produced by the drive coil, the motion voltage component and drive noise voltage component combining to form said tachometer voltage;
measuring a pickup voltage with a pickup coil which is situated adjacent to the drive coil, and at least approximately parallel to, and at least approximately concentric with, the drive coil, and which is constructed to produce a voltage from the temporal variation in the lines of magnetic flux produced from the drive coil; and
combining the tachometer voltage and the pickup voltage into an output voltage differing from the motion voltage in an amount less than the difference between the tachometer voltage and the motion voltage.

6. The method of claim 5, wherein the magnets, coils, and voltage combining means are situated and constructed such that the motion voltage is proportional to the relative speed of the external magnet and the tachometer coil.

7. The method of claim 5, wherein the pickup coil is stationary with respect to the external magnet.

8. The method of claim 5, wherein the step of combining the tachometer voltage and the pickup voltage comprises subtracting the pickup voltage from the tachometer voltage.

9. In an electric motor comprising:
an external magnet which produces temporally fixed lines of magnetic flux; and
a drive coil, energized by a source of varying current, said drive coil being movable with respect to the external magnet, and producing temporally varying lines of magnetic flux;
means for measuring the speed of said motor, said means comprising:
means for measuring a tachometer voltage with a tachometer coil, the tachometer coil being stationary with respect to the drive coil, and being situated and constructed to produce a motion voltage component from its motion through the lines of flux produced by the external magnet and a drive noise voltage component from temporal variations in the lines of magnetic flux produced by the drive coil, the motion voltage component and drive noise voltage component combining to form said tachometer voltage;

means for measuring a pickup voltage with a pickup coil which is situated adjacent to the drive coil, and at least approximately parallel to, and at least approximately concentric with, the drive coil, and which is constructed to produce a voltage from the temporal variation in the lines of magnetic flux produced from the drive coil; and means for combining the tachometer voltage and the pickup voltage into an output voltage differing from the motion voltage in an amount less than the difference between the tachometer voltage and the motion voltage.

10. The apparatus of claim 9, wherein the magnets, coils, and voltage combining means are situated and constructed such that the motion voltage is proportional to the relative speed of the external magnet and the tachometer coil.

11. The apparatus of claim 9, wherein the pickup coil is stationary with respect to the external magnet.

12. The apparatus of claim 9, wherein the means for combining the tachometer voltage and the pickup voltage comprises means for subtracting the pickup voltage from the tachometer voltage.

* * * * *